United States Patent
Fonseca et al.

(10) Patent No.: US 10,783,305 B1
(45) Date of Patent: Sep. 22, 2020

(54) SYSTEM, METHOD, AND COMPUTER PROGRAM PRODUCT FOR HANDLING COMBINATIONAL LOOPS ASSOCIATED WITH THE FORMAL VERIFICATION OF AN ELECTRONIC CIRCUIT DESIGN

(71) Applicant: Cadence Design Systems, Inc., San Jose, CA (US)

(72) Inventors: Matheus Nogueira Fonseca, Minas Gerais (BR); Tulio Paschoalin Leao, Betim (BR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/275,280

(22) Filed: Feb. 13, 2019

(51) Int. Cl.
*G06F 30/3323* (2020.01)
*G06F 30/30* (2020.01)
*G06F 119/12* (2020.01)

(52) U.S. Cl.
CPC .......... *G06F 30/3323* (2020.01); *G06F 30/30* (2020.01); *G06F 2119/12* (2020.01)

(58) Field of Classification Search
USPC ........................................ 716/108
See application file for complete search history.

(56) References Cited

U.S. PATENT DOCUMENTS

| 2005/0062496 | A1* | 3/2005 | Gidon | G06F 30/327 326/40 |
| 2016/0210389 | A1* | 7/2016 | Baumgartner | G06F 30/33 |

* cited by examiner

*Primary Examiner* — Bryce M Aisaka
(74) *Attorney, Agent, or Firm* — Mark H. Whittenberger, Esq.; Holland & Knight LLP (57) ABSTRACT

The present disclosure relates to a method for electronic circuit design. Embodiments may include providing, using at least one processor, an electronic design and isolating a combinational loop associated with the electronic design. Embodiments may further include inserting a sequential element in a loop path of the combinational loop, wherein the sequential element has a clock that is at least twice as fast as a fastest system clock associated with the electronic design. Embodiments may also include generating a property that determines whether an input and an output of the sequential element is never different and determining whether the property is true using formal verification.

20 Claims, 8 Drawing Sheets

SYSTEM, METHOD, AND COMPUTER PROGRAM PRODUCT FOR HANDLING COMBINATIONAL LOOPS ASSOCIATED WITH THE FORMAL VERIFICATION OF AN ELECTRONIC CIRCUIT DESIGN

FIELD OF THE INVENTION

The present disclosure relates to electronic design verification, and more specifically, to a method for handling combinational loops associated with formal verification.

DISCUSSION OF THE RELATED ART

Formal verification of an electronic design relies upon a system of constraints to communicate the legal state space to the proof engines. Test and control logic, PAD-ring logic, and various optimization techniques can introduce combinational loops on an electronic design. A combinational loop means that there is a non-sequential path between one point and itself. When such structures are built by intent/design, they are called "intentional loops". Loops in this category are usually functionally false. In other words, although structurally a combinational loop, a value will never propagate back.

When loops are purely structural, electronic design automation ("EDA") tools, such as formal and routing, can leverage optimizations and lead to more precise models. However, ensuring a loop is safe to be represented on these domains is a costly and intricate operation. Moreover, inspecting such constructions manually is difficult, error-prone and very often impracticable, given the scale of current electronic designs.

There are also cases of "intentional loops" that are functionally true but only on invalid states of the DUT. In such cases, verification engineers need to break, either manually or automatically, the loop path in order to proceed with verification. A wrong assessment (manual or automatic) may lead to false positives and false negatives.

In order to proceed safely in the presence of structural loops, it is often necessary to determine whether they are functional or not (i.e., to determine whether or not a value can propagate completely around the full loop). One obvious approach to this problem that is already available in industry is to use a dual-rail model. In this technique, two instances of the relevant design logic (that is, the logic contained in the loop itself, as well as the driver logic that fans into the loop logic) are instantiated side-by-side, all free signals in one instance are tied to the corresponding signals in the other instance, and the relevant initial state is applied to both instances. With this setup established, both loops are broken at some arbitrary point (the same point in each loop), converting the closed loops into open arcs, and the new free input at the head of one arc is tied to the corresponding new free input at the head of the other arc. If it can be proven, under the stated constraints, that this difference applied to the "input" ends of the arcs can never propagate to the output ends (in other words, if it can be proven that the output end of one arc instance will always have the same value as the output end of the other arc instance), then the loop being analyzed is merely structural, and not functional.

Although the dual-rail approach is intuitive and analytically sound, it can be problematic in that it forces the duplication of both the loop logic and the driving logic. This can lead to both complexity and state-space explosion, which often results in a failure of the analysis to converge and prevents the analysis from producing useful results (either at all or in a reasonable time).

In addition, real designs often contain a large number of structural loops, and logic that is a part of the structural path for one loop may serve as driving logic for another loop such that breaking the first loop to create an arc may allow ordinarily unreachable violation traces to occur for the second loop, causing it to be falsely classified as functional. For this reason, and others, the dual-rail approach is typically limited to analyzing loops one at a time. This serial analysis represents yet another bottleneck inherent to the dual-rail approach.

Existing art unrolls combinational loops and performs analysis on the underlying logic. However, several problems arise from this analysis. The main problem lies in the complexity included when analyzing the full combinational loop path, as verifying it could take as long as the final formal verification to be conducted on the netlist in which the loop resides. Moreover, the existence of neighboring combinational loops leads to the need of additional techniques and refinements to scale/handle such structures.

There are two conventional approaches to handle combinational loops, one manual and the other automatic. The first one relies on a visual inspection of loops, searching for places to break the loop path. The later one, the automatic approach, finds places to break the loop (i.e. cut the actual connection between signals). If the loop path is structurally broken with no constraints tying their ends, both approaches will free up logic, thus leading to possibly false negatives proof results. If the broken loop path ends are constrained to be equal, this may lead to false positives. Moreover, such loop cut-points might not be consistent across different formal proof runs, which can lead to different results.

SUMMARY OF DISCLOSURE

In one or more embodiments of the present disclosure, a computer-implemented method for electronic circuit design is provided. The method may include providing, using at least one processor, an electronic design and isolating a combinational loop associated with the electronic design. The method may further include inserting a sequential element in a loop path of the combinational loop, wherein the sequential element has a clock that is at least twice as fast as a fastest system clock associated with the electronic design. The method may also include generating a property that determines whether an input and an output of the sequential element is never different and determining whether the property is true using formal verification.

One or more of the following features may be included. In some embodiments, the sequential element may be a flip-flop. Determining whether the property is true may include determining if the combinational loop is stable. The method may include isolating a second combinational loop associated with the electronic design. The method may further include inserting a second sequential element in a second loop path associated with the second combinational loop. The method may also include generating a graphical user interface configured to display the input or the output of the sequential element. The method may include generating a second property that determines whether an input and an output of the second sequential element is never different and determining, in parallel, whether the property and the second property are true using formal verification.

In one or more embodiments of the present disclosure a computer-readable storage medium having stored thereon instructions, which when executed by a processor result in one or more operations is provided. Operations may include providing, using at least one processor, an electronic design and isolating a combinational loop associated with the electronic design. Operations may further include inserting a sequential element in a loop path of the combinational loop, wherein the sequential element has a clock that is at least twice as fast as a fastest system clock associated with the electronic design. Operations may also include generating a property that determines whether an input and an output of the sequential element is never different and determining whether the property is true using formal verification.

One or more of the following features may be included. In some embodiments, the sequential element may be a flip-flop. Determining whether the property is true may include determining if the combinational loop is stable. Operations may include isolating a second combinational loop associated with the electronic design. Operations may further include inserting a second sequential element in a second loop path associated with the second combinational loop. Operations may also include generating a graphical user interface configured to display the input or the output of the sequential element. Operations may include generating a second property that determines whether an input and an output of the second sequential element is never different and determining, in parallel, whether the property and the second property are true using formal verification.

In one or more embodiments of the present disclosure, a system is provided. The system may include a computing device having at least one processor configured to provide, using at least one processor, an electronic design and isolate a combinational loop associated with the electronic design. The at least one processor may be further configured to insert a sequential element in a loop path of the combinational loop, wherein the sequential element has a clock that is at least twice as fast as a fastest system clock associated with the electronic design. The at least one processor may be further configured to generate a property that determines whether an input and an output of the sequential element is never different and determine whether the property is true using formal verification.

One or more of the following features may be included. In some embodiments, the sequential element may be a flip-flop. Determining whether the property is true may include determining if the combinational loop is stable. The at least one processor may be further configured to isolate a second combinational loop associated with the electronic design. The at least one processor may be further configured to insert a second sequential element in a second loop path associated with the second combinational loop. The at least one processor may be further configured to generate a graphical user interface configured to display the input or the output of the sequential element.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As discussed above, combinational loops often appear in electronic designs, which may or may not be expected and/or desired. Generally, the verification engineers and designers want to know whether these loops are stable or unstable, as the latter might result in a system malfunction such as a design error and/or a missing configuration in the verification environment. Embodiments included herein provide a methodology for verifying stability in bulk without changing the design functionality.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Figure 1:
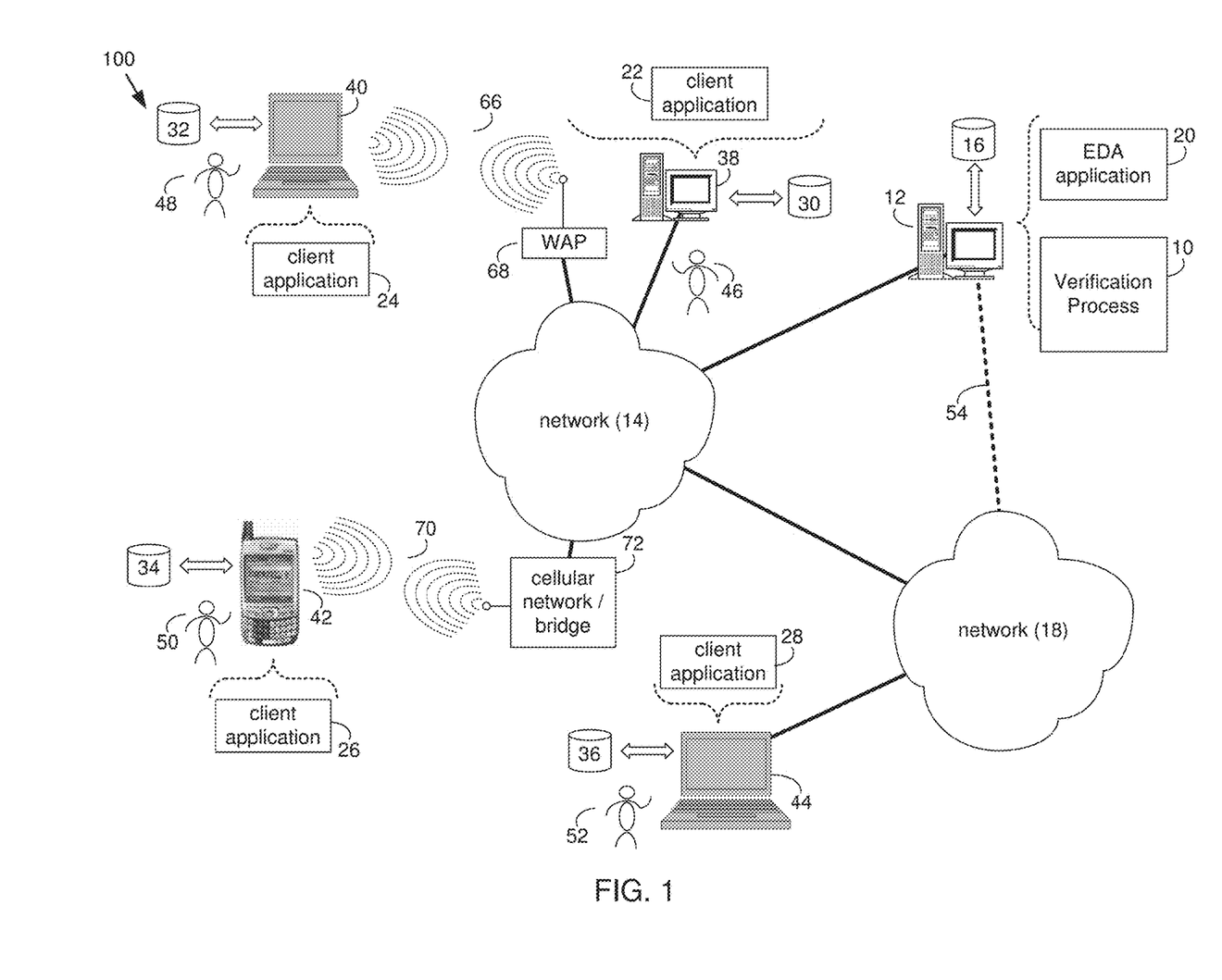
FIG. 1 is a diagram depicting an embodiment of a system in accordance with the present disclosure.

Referring to FIG. 1, there is shown a verification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, verification process 10 may reside on and be executed, in whole or in part, by a client electronic device, such as a personal computer, notebook computer, personal digital assistant, or the like.

The instruction sets and subroutines of verification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization and/or verification.

Verification process 10 may be a stand alone application, or may be an applet/application/script that may interact with and/or be executed within EDA application 20. In addition/as an alternative to being a server-side process, verification process 10 may be a client-side process (not shown) that may reside on a client electronic device (described below) and may interact with an EDA client application (e.g., one or more of EDA client applications 22, 24, 26, 28). Further, verification process 10 may be a hybrid server-side/client-side process that may interact with EDA application 20 and an EDA client application (e.g., one or more of client applications 22, 24, 26, 28). As such, verification process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize verification process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18.

Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
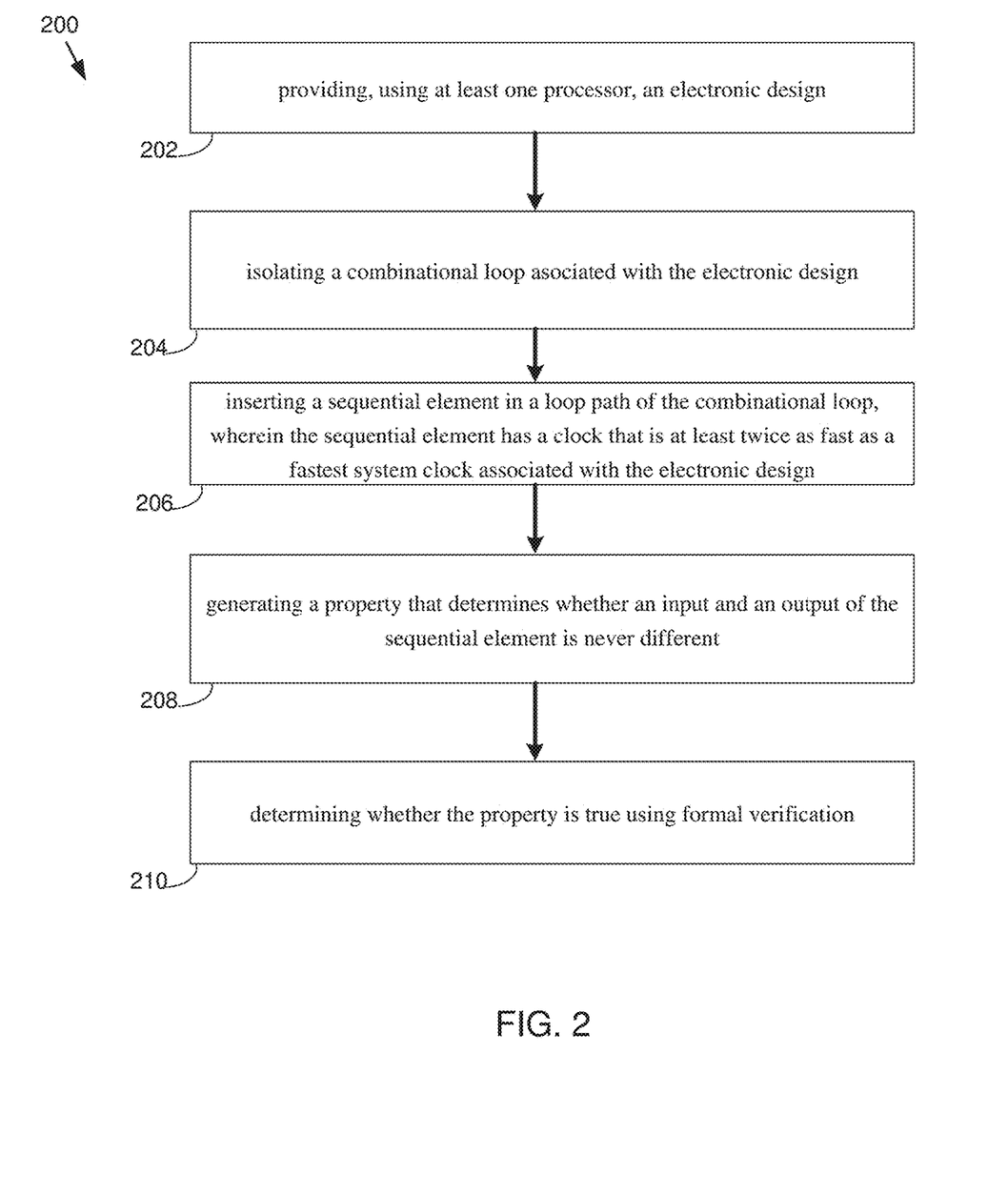
FIG. 2 is a flowchart depicting operations consistent with the verification process in accordance with an embodiment of the present disclosure.

Referring now to FIG. 2, an exemplary flowchart 200 depicting operations consistent with verification process 10 is provided. Embodiments may include providing (202), using at least one processor, an electronic design and isolating (204) a combinational loop associated with the electronic design. The method may further include inserting (206) a sequential element in a loop path of the combinational loop, wherein the sequential element has a clock that is at least twice as fast as a fastest system clock associated with the electronic design. The method may also include generating (208) a property that determines whether an input and an output of the sequential element is never different and determining (210) whether the property is true using formal verification.

The Electronic and Design automation industry is assailed by the combinational loops problem, not only it is not trivial to identify them, but it is often even harder to ascertain whether they are stable or unstable. Unstable loops are often sources of bugs in the design because they produce erratic and unpredictable behavior on an electronic chip, which may lead to spurious or even complete hardware failures. One example of an unstable loop is provided in FIG. 3. The conventional ways of verifying whether a combinational loop is stable or not involve isolating the loop in question in the design and then applying stimuli and/or creating properties around it, to guarantee that it is indeed stable or not.

The conventional implementation has one fundamental problem, with some implications, which is that it requires the design to be modified in order to isolate the loop. This means that if there are consecutive combinatorial loops that share an element or part of the path, isolating the combinational loop might produce a design that is not faithful to the original one and thus this might lead to false positives and/or negatives, as it doesn't accurately model the intended behavior. This is alarming enough as it is, due to the uncertain results, but it also poses a potential performance problem, as loops have to be analyzed sequentially and individually.

Figure 3:
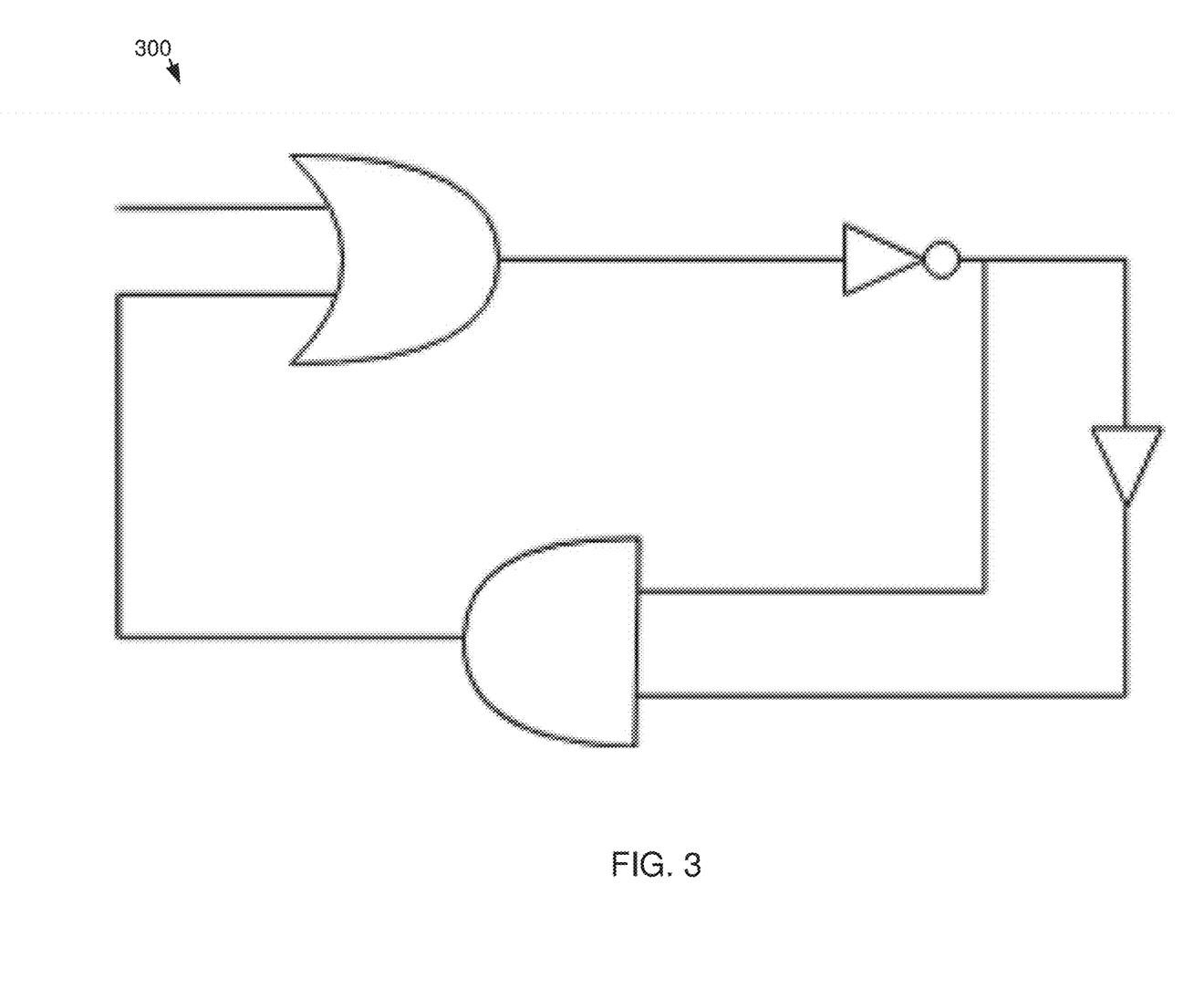
FIG. 3 is a diagram depicting a loop consistent with an embodiment in accordance with the present disclosure.
Figure 4:
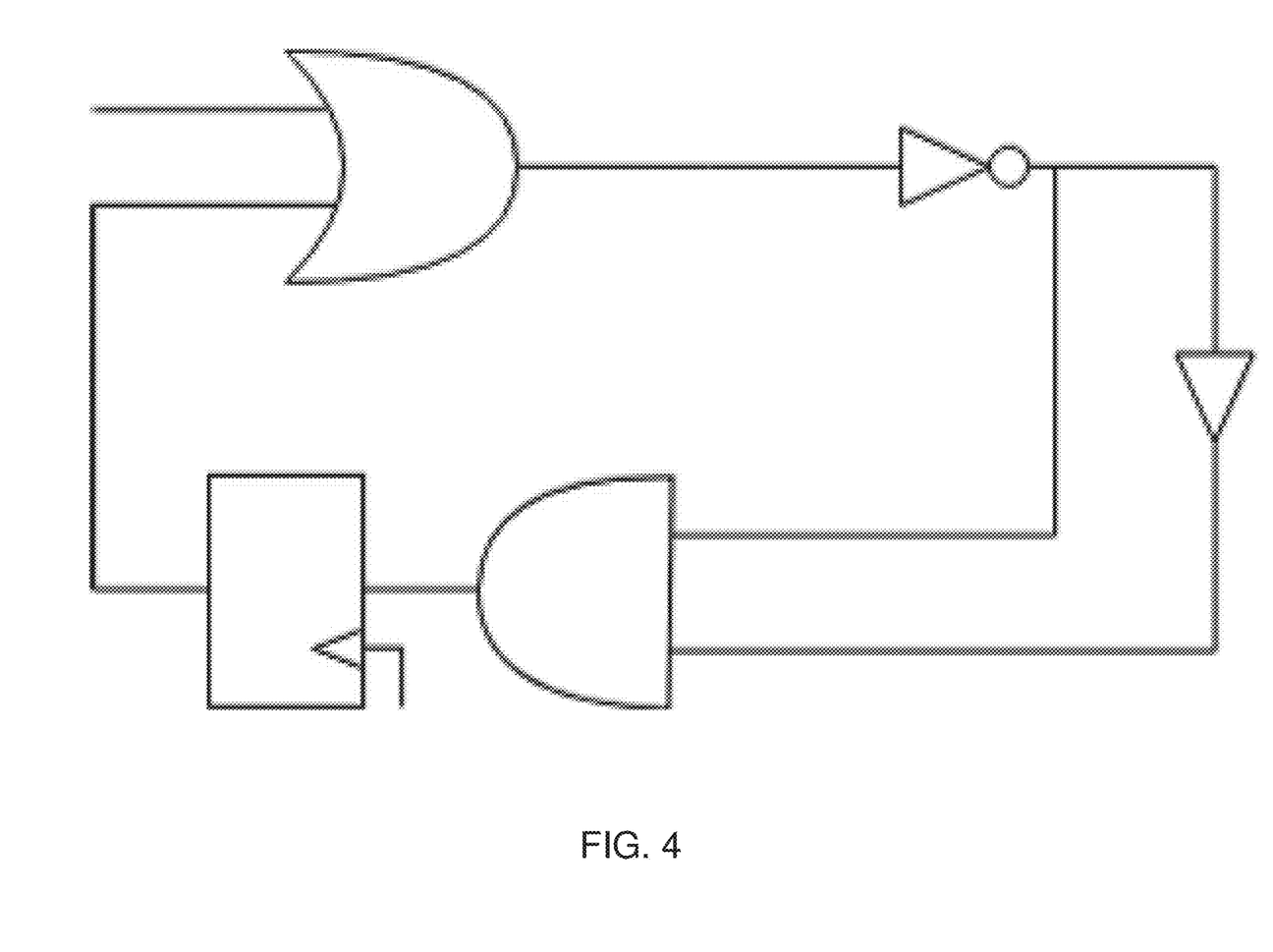
FIG. 4 is a diagram depicting a loop consistent with an embodiment in accordance with the present disclosure.

Accordingly, embodiments of verification process 10 described herein may leverage the use of properties and formal verification to prove whether one or more combinational loops are unstable. As such, in some embodiments a flop may be inserted in a loop path, with a clock that is, at least, twice as fast as the design's or system's fastest clock. The circuit from FIG. 3 is shown with this particular modification in FIG. 4. By making it transition faster than circuit, it is possible to extrapolate that it will seem to be combinational for the remainder of the circuit and thus may not affect the circuit functionality. Alternatively, it does insert a sequential element, even though fast-triggering, where it is possible, for a brief instant, to observe and compare its input and output.

Figure 5:
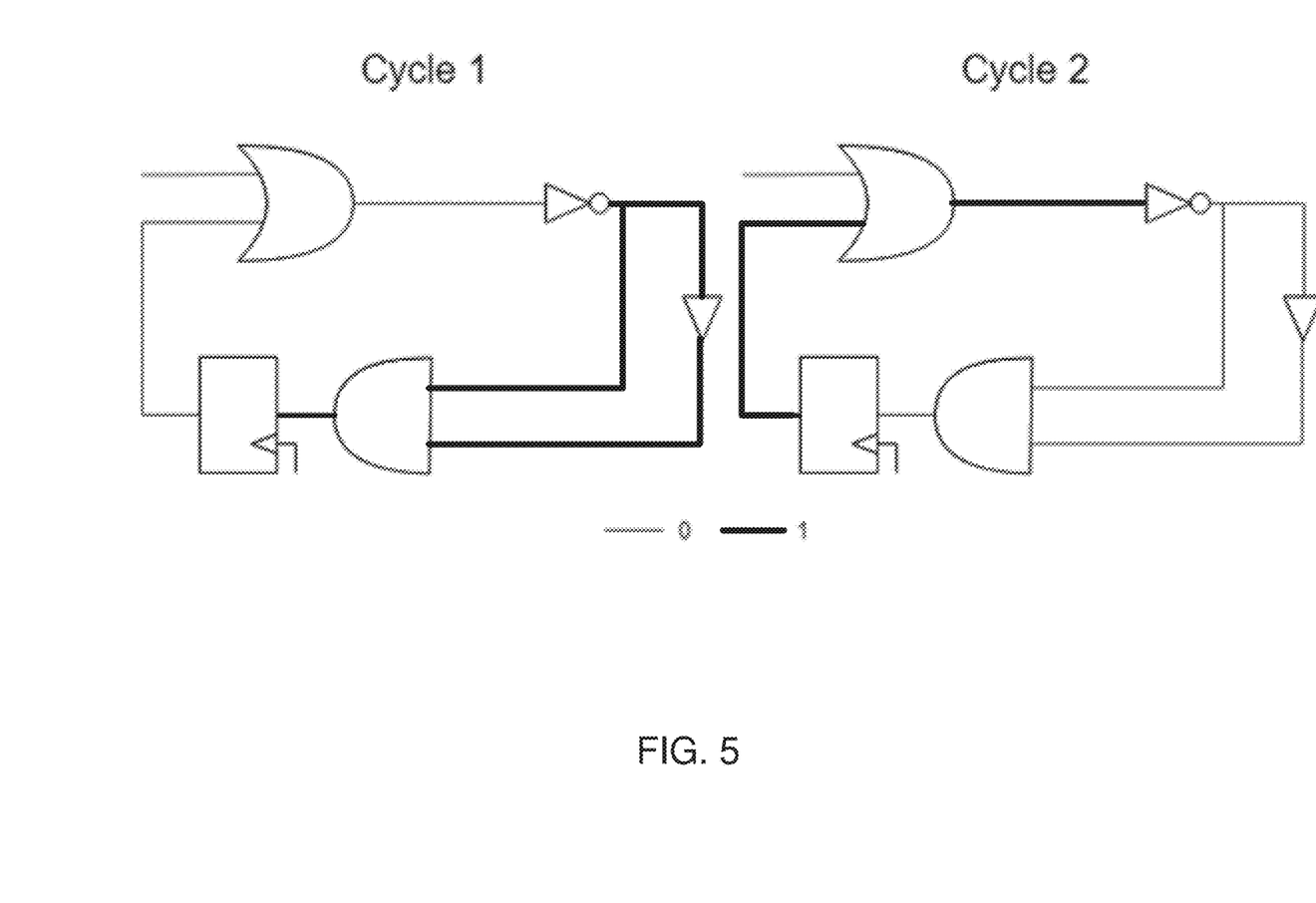
FIG. 5 is a diagram depicting a loop consistent with an embodiment in accordance with the present disclosure.

Embodiments included herein may generate a property that ascertains that the input and output of this artificially inserted flop is never different (without considering the reset process of the flops). Verification process 10 may be used to prove that this property is true (e.g., using formal verification techniques) in order to guarantee that the loop is stable. For example, showing that the value circling the loop never oscillated. If violated, it means that there are conditions where the input and output may be different and thus, the loop may oscillate unstably. An application of this idea and how it can be used to detect unstable loops is shown on FIG. 5. During cycle 1, a stimuli may be applied to the OR gate and may be instantly propagated to the input of the flop. After the clock triggers, this change may propagate back to the output of the flop and the rest of the circuit. This combination may lead to an oscillatory behavior and the circuit may never hold a concrete value, proving to be unstable.

In some embodiments, the property to be synthesized may be one that observes whether the output of a flop is equal to its input on the previous cycle. This may be generalized to a number N of loops. This process may operate even when they are concentric, as long as the a cascade of N flops has all of the clocks or the most critical clock ticking at least N times faster than the design clock.

Figure 6:
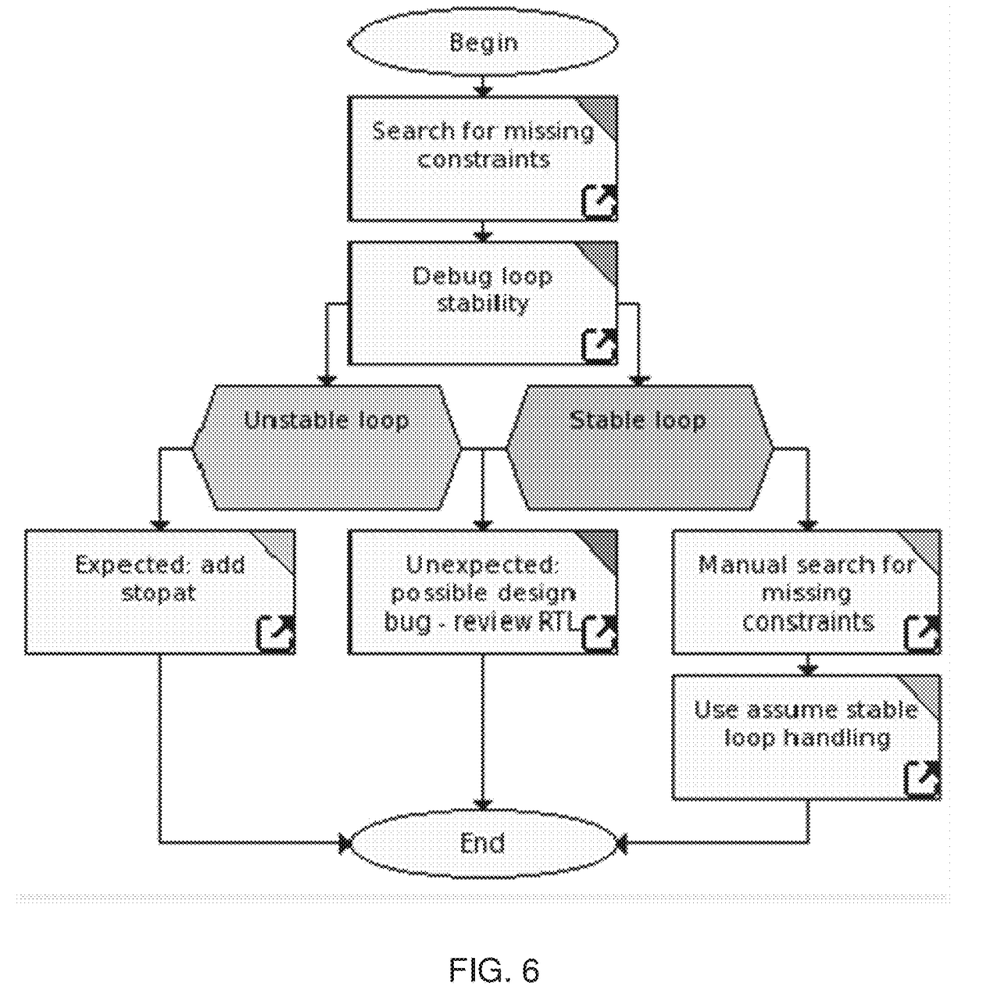
FIG. 6 is a flowchart depicting operations consistent with the verification process in accordance with an embodiment of the present disclosure.

Referring now to FIG. 6, a flowchart that may be associated with EDA application 20 is provided. Flowchart 600 depicts an example flow for assessing loop functionality and how to proceed with a debugging process. Users often attempt to disable the loops first and, if those are not successful, the user has to ascertain the stability of the loop to define the proper course of action.

Figure 7:
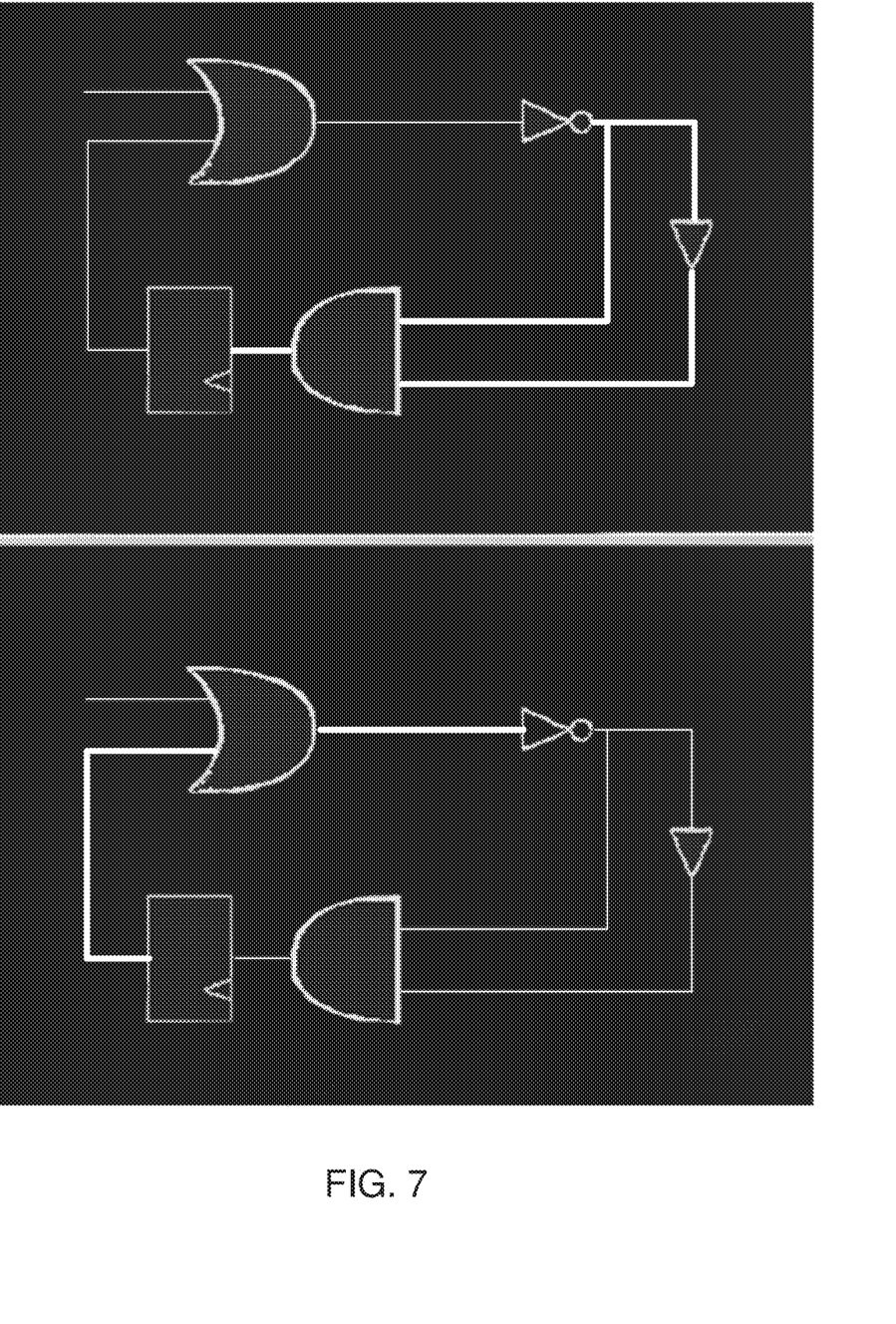
FIG. 7 is a diagram depicting a graphical user interface consistent with an embodiment in accordance with the present disclosure.

Referring now to FIG. 7, an embodiment showing a graphical user interface 700 consistent with verification process 10 is provided. This embodiment shows an example graphical user interface (GUI) that may depict and arrange the circuits and behaviors depicted in FIG. 5 for ease of understanding and exploration.

Figure 8:
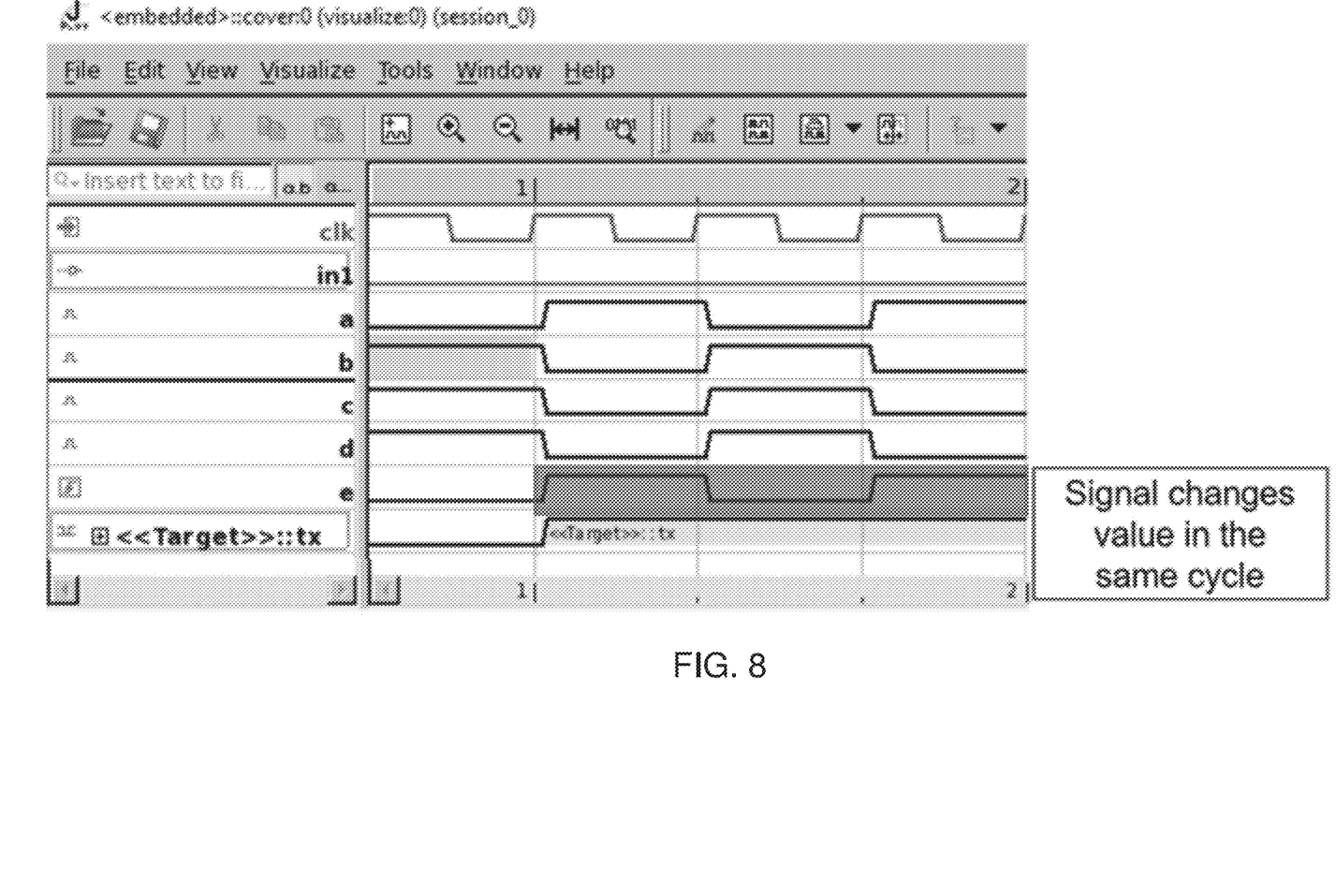
FIG. 8 is a diagram depicting a graphical user interface consistent with an embodiment in accordance with the present disclosure.

Referring now to FIG. 8, an embodiment showing a graphical user interface 800 consistent with verification process 10 is provided. GUI 800 includes a waveform depicting the values of each wire of the circuit as the cycles pass is shown in an embodiment of a graphical user interface (GUI). This is another alternative embodiment, as opposed to FIG. 7, where a user might have access to in order to confirm that the result found is sound and that the loop is indeed unstable and should be dealt with.

Unstable loops are critical and designers want to solve them, only showing whether they were or not detected as unstable might not be sufficient information for them, so a debug interface might be necessary, as shown in FIG. 7 and FIG. 8. One such way of representing it would be unrolling the cycle in a waveform to expose the defect, this allows the user inspect and or confirm, if need be, the instability, which is depicted on FIG. 8.

Embodiments of the present disclosure, though it may still modify the design, does not change its functionality, as the conventional solution would, because it inserts elements that do not change the behavior and does not remove any other constructions. Thus, all properties will hold their value, either true or not, and the circuit will behave in the same way as it was intended to. The current implementation breaks the design into isolated sections and evaluates loops one at a time, whereas embodiments of the present disclosure maintain the design integrity. In other words, verification process 10 does not require loops to be analyzed one at a time, hence after the creation of the flops, the system may ascertain the stability of all the loops at once or in parallel, proving to be scalable and potentially faster on real world scenarios where the number of loops is large.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method comprising:
providing, using at least one processor, an electronic design;
isolating a combinational loop associated with the electronic design;
inserting a sequential element in a loop path of the combinational loop, wherein the sequential element has a clock that is at least twice as fast as a fastest system clock associated with the electronic design;
generating a property that determines whether an input and an output of the sequential element is never different; and
determining whether the property is true using formal verification.

2. The computer-implemented method of claim 1, wherein the sequential element is a flip-flop.

3. The computer-implemented method of claim 1, wherein determining whether the property is true includes determining if the combinational loop is stable.

4. The computer-implemented method of claim 1, further comprising:
isolating a second combinational loop associated with the electronic design.

5. The computer-implemented method of claim 1, further comprising:
inserting a second sequential element in a second loop path associated with the second combinational loop.

6. The computer-implemented method of claim 5, further comprising:
generating a second property that determines whether an input and an output of the second sequential element is never different; and
determining whether the property and the second property are true using formal verification.

7. The computer-implemented method of claim 1, further comprising:
generating a graphical user interface configured to display the input or the output of the sequential element.

8. A computer-readable storage medium for use in an electronic design, the computer-readable storage medium having stored thereon instructions that when executed by a machine result in one or more operations, the operations comprising:
providing, using at least one processor, an electronic design;
isolating a combinational loop associated with the electronic design;
inserting a sequential element in a loop path of the combinational loop, wherein the sequential element has a clock that is at least twice as fast as a fastest system clock associated with the electronic design;
generating a property that determines whether an input and an output of the sequential element is never different; and
determining whether the property is true using formal verification.

9. The computer-readable storage medium of claim 8, wherein, wherein the sequential element is a flip-flop.

10. The computer-readable storage medium of claim 8, wherein determining whether the property is true includes determining if the combinational loop is stable.

11. The computer-readable storage medium of claim 8, further comprising:
isolating a second combinational loop associated with the electronic design.

12. The computer-readable storage medium of claim 8, further comprising:
inserting a second sequential element in a second loop path associated with the second combinational loop.

13. The computer-readable storage medium of claim 12, further comprising:
generating a second property that determines whether an input and an output of the second sequential element is never different; and
determining whether the property and the second property are true using formal verification.

14. The computer-readable storage medium of claim 8, further comprising:
generating a graphical user interface configured to display the input or the output of the sequential element.

15. A system comprising:
a computing device having at least one processor configured to provide, using at least one processor, an electronic design and isolate a combinational loop associated with the electronic design, the at least one processor further configured to insert a sequential element in a loop path of the combinational loop, wherein the sequential element has a clock that is at least twice as fast as a fastest system clock associated with the electronic design, the at least one processor further configured to generate a property that determines whether an input and an output of the sequential element is never different and determine whether the property is true using formal verification.

16. The system of claim 15, wherein the sequential element is a flip-flop.

17. The system of claim 15, wherein determining whether the property is true includes determining if the combinational loop is stable.

18. The system of claim 15, further comprising:
isolating a second combinational loop associated with the electronic design.

19. The system of claim 15, further comprising:
inserting a second sequential element in a second loop path associated with the second combinational loop.

20. The system of claim 15, further comprising:
generating a graphical user interface configured to display the input or the output of the sequential element.

* * * * *